United States Patent
Park et al.

(10) Patent No.: US 11,257,488 B2
(45) Date of Patent: Feb. 22, 2022

(54) SOURCE LOCALIZATION METHOD BY USING STEERING VECTOR ESTIMATION BASED ON ON-LINE COMPLEX GAUSSIAN MIXTURE MODEL

(71) Applicant: SOGANG UNIVERSITY RESEARCH FOUNDATION, Seoul (KR)

(72) Inventors: Hyung Min Park, Seoul (KR); Seo Young Lee, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 135 days.

(21) Appl. No.: 16/299,586

(22) Filed: Mar. 12, 2019

(65) Prior Publication Data

US 2019/0237066 A1 Aug. 1, 2019

(30) Foreign Application Priority Data

Jan. 26, 2018 (KR) .................. 10-2018-0010037

(51) Int. Cl.
*G10L 21/0208* (2013.01)
*G10L 15/20* (2006.01)
(Continued)

(52) U.S. Cl.
CPC ............ *G10L 15/20* (2013.01); *G01S 3/8006* (2013.01); *G10L 15/22* (2013.01); *G10L 21/0364* (2013.01); *G10L 25/84* (2013.01)

(58) Field of Classification Search
CPC .......... G10L 2021/02166; G10L 21/028; G10L 15/20
See application file for complete search history.

(56) References Cited

U.S. PATENT DOCUMENTS

2013/0308790 A1* 11/2013 Claussen ................ H04R 1/406
381/92
2016/0381591 A1* 12/2016 Lysejko ................. H01Q 1/246
370/252

(Continued)

OTHER PUBLICATIONS

Higuchi, et al., Online MVDR Beamformer Based on Complex Gaussian Mixture Model With Spatial Prior for Noise Robust ASR, IEEE/ACM Transactions on Audio, Speech, and Language Processing, vol. 25, No. 4, Apr. 2017.

*Primary Examiner* — Jakieda R Jackson
(74) *Attorney, Agent, or Firm* — Cantor Colburn LLP

(57) ABSTRACT

Provided is a source localization in an apparatus for performing a source localization, a target sound source enhancement or speech recognition. The source localization method using input signals input from a plurality of microphones, comprising steps of: (a) obtaining a log likelihood function or an auxiliary function under the assumption that a target source signal mixed with noises satisfies a CGMM model; (b) obtaining an equation for estimating parameter values of the log likelihood function or the auxiliary function so that a value of the log likelihood function or the auxiliary function is maximized recursively in each time frame; (c) estimating a covariance matrix recursively in each time frame; and (d) estimating a steering vector recursively by using the estimated covariance matrix, wherein the steering vector of the target sound source is estimated from the input signals.

4 Claims, 2 Drawing Sheets

(51) Int. Cl.
*G10L 15/22* (2006.01)
*G01S 3/80* (2006.01)
*G10L 21/0364* (2013.01)
*G10L 25/84* (2013.01)

(56) References Cited

U.S. PATENT DOCUMENTS

| | | | |
|---|---|---|---|
| 2017/0047079 A1* | 2/2017 | Hiroe | G10L 25/78 |
| 2017/0140771 A1* | 5/2017 | Taniguchi | G10L 15/05 |
| 2018/0240471 A1* | 8/2018 | Markovich Golan | G10L 21/0232 |

* cited by examiner

FIG. 1 input: $y_{f,t}^m, \forall t, \forall f, \forall m$ initialization:

$t = 0$,
$R_f^{(x+n)} = y_{f,1} y_{f,1}^H$, $R_f^{(n)} = I$
$(\Gamma_f^{(x+n)})^{-1} = \text{diag}(y_{f,1} y_{f,1}^H)^{-1}$, $(\Gamma_f^{(n)})^{-1} = I$
$\Gamma_f^{(x+n)} = \text{diag}(y_{f,1} y_{f,1}^H)$, $\Gamma_f^{(n)} = \text{diag}(y_{f,1} y_{f,1}^H)$,
normalizing $R_f^{(x+n)}, R_f^{(n)}$ repeat

$t = t + 1$,
$\phi_{f,t}^{(\nu)} \leftarrow \frac{1}{M} y_{f,t}^H (R_f^{(\nu)}(t-1))^{-1} y_{f,t}$ $\lambda_{f,t}^{(\nu)} \leftarrow \frac{\kappa_f^{(\nu)} p(y_{f,t} | d_{f,t} = \nu, \Theta)}{\sum_\nu \kappa_f^{(\nu)} p(y_{f,t} | d_{f,t} = \nu, \Theta)} = \frac{\kappa_f^{(\nu)} \mathcal{N}_c(y_{f,t}; 0, \phi_{f,t}^{(\nu)} R_f^{(\nu)}(t-1))}{\sum_\nu \kappa_f^{(\nu)} \mathcal{N}_c(y_{f,t}; 0, \phi_{f,t}^{(\nu)} R_f^{(\nu)}(t-1))}$ $\kappa_f^{(\nu)} \leftarrow \frac{1}{\sum_t \gamma^{T-t}} \sum_t \gamma^{T-t} \lambda_{f,t}^{(\nu)}$ $(\Gamma_f^{(\nu)}(t))^{-1} = \gamma^{-1}[(\Gamma_f(t-1))^{-1} - \frac{(\Gamma_f(t-1))^{-1} y_{f,t} y_{f,t}^H (\Gamma_f(t-1))^{-1}}{\gamma \frac{\phi_{f,t}^{(\nu)}}{\lambda_{f,t}^{(\nu)}} + y_{f,t}^H (\Gamma_f(t-1))^{-1} y_{f,t}}]$ $(R_f^{(\nu)}(t))^{-1} = (\sum_{n_t=1}^{t} \gamma^{t-n_t} \lambda_{f,n_t}^{(\nu)}) (\Gamma_f^{(\nu)}(t))^{-1}$ $\Gamma_f^{'(\nu)}(t) = \gamma \Gamma_f^{'(\nu)}(t-1) - \lambda_{f,t}^{(\nu)} y_{f,t} y_{f,t}^H$ $R_f^{'(\nu)}(t) = \frac{1}{\sum_{n_t=1}^{t} \gamma^{t-n_t} \lambda_{f,n_t}^{(\nu)}} \Gamma_f^{'(\nu)}(t)$ $r_{f,t} = EVD(R_f^{'(x+n)}(t) - R_f^{'(n)}(t))$ until t is equal to $N_t$

SOURCE LOCALIZATION METHOD BY USING STEERING VECTOR ESTIMATION BASED ON ON-LINE COMPLEX GAUSSIAN MIXTURE MODEL

BACKGROUND OF THE INVENTION

1. Field of the Invention

The present invention relates to a source localization method by using a steering vector estimation, and more particularly, to a source localization method using steering vector estimation based on an on-line complex Gaussian mixture model using a recursive least squares technique.

2. Description of the Related Art

For speech recognition, in a process where a target sound source signal such as a voice of a target speaker is entering the microphone, surrounding noise is added to the target sound source signal, and thus, the target sound source signal mixed with noise is input to the microphone.

In order to localize accurately a target sound source or remove selectively noises while preserve the target sound, an accurate steering vector estimation to the target sound source in the microphones array needs to be performed ahead. In general source localization estimation methods, the priori information such as spatial arrangement information of microphones is needed for a steering vector estimation.

However, the priori information of the microphones may be different from a real location of the microphones. If an incorrect steering vector is estimated due to the inaccuracy of such priori information, the noise may not be removed, or a distorted output signal may appear. Therefore, in order to solve this problem, it is possible to use a steering vector estimation method using a complex Gaussian mixture model (CGMM) in which priori information is not required.

In a conventional CGMM-based steering vector estimation method, under the assumption that an input signal of a microphone can be classified into a complex Gaussian mixture model constituting two sets of a target sound or a target sound+noise, the probability that the input signal is included in the two sets is estimated. This method proved to be superior to a method in the related art using priori information, but due to the convergence process, calculation can only be performed over the entire time frames or several time frames, and thus, this method is not suitable for real-time processing. Accordingly, the present invention proposes a real-time steering vector estimation algorithm that solves the disadvantages of the method in the related art using the CGMM and updates parameters recursively in each time frame.

Hereinafter, a CGMM-based steering vector estimation algorithm in the related art will be described.

When a value of an input signal of an m-th microphone in a time-frequency domain among total M microphones obtained through short-term Fourier transform is denoted by $y_{f,t,m}$, values of signals obtained from all the M microphones can be expressed as follows.

$$y_{f,t} = [y_{f,t,1}, y_{f,t,2} \cdots y_{f,t,M}]^T \quad \text{[Equation 1]}$$

It is assumed that the input signal can be classified into two sets (a set of target source signals mixed with noise and a set containing only noise), the input signal can be expressed by steering vectors $r_f^{(v)}$ and target source signals $s_{f,t}$ as follows.

$$y_{f,t} = r_f^{(v)} s_{f,t}^{(v)} \text{(where } d_{f,t} = v) \quad \text{[Equation 2]}$$

Herein, $d_{f,t}$ denotes a data in a case where the observation signal is in a state of a time frame t and a frequency f, and v indicates an index of a set of signal+noise (x+n) or noise (n). Under the assumption that the target source signal $s_{f,t}^{(v)}$ is in accordance with a complex Gaussian mixture model, a probability density function of the target signal is a complex Gaussian distribution, as expressed as follows.

$$s_{f,t} | d_{f,t} = v \sim N_c(0, \phi_{f,t}^{(v)}) \quad \text{[Equation 3]}$$

In a case of a multi-channel observation signal, $\phi_{f,t}^{(v)}$ denotes a dispersion of a signal at corresponding time and frequency.

$$y_{f,t} | d_{f,t} = v \sim N_c(0, \phi_{f,t}^{(v)} R_f^{(v)}), R_f^{(v)} = r_f^{(v)} r_f^{(v)H} \quad \text{[Equation 4]}$$

The estimation of the parameters can be performed with an Expectation-Maximization (EM) algorithm which is the representative optimization method of the complex Gaussian mixture model and maximizes the following an auxiliary function or the following a log likelihood expressed by the cost function.

$$Q(\Theta) = \sum_{f,t} \sum_{v} \lambda_{f,t}^{(v)} \log N_c(y_{f,t}; 0, \phi_{f,t}^{(v)} R_f^{(v)}) \quad \text{[Equation 5]}$$

$\lambda_{f,t}^{(v)}$ indicates a posteriori probability that $d_{f,t}^{(v)}$ is v, and an estimation equation of $\lambda_{f,t}^{(v)}$ for maximizing the auxiliary function or the log likelihood is as follows.

$$\lambda_{f,t}^{(v)} \leftarrow \frac{p(y_{f,t} | d_{f,t} = v, \Theta)}{\sum_v p(y_{f,t} | d_{f,t} = v, \Theta)} \quad \text{[Equation 6]}$$

$$p(y_{f,t} | d_{f,t} = v, \Theta) = N_c(y_{f,t}; 0, \phi_{f,t}^{(v)} R_f^{(v)}) \quad \text{[Equation 7]}$$

In a similar method, an estimation equation of $\phi_{f,t}^{(v)}$ and $R_f^{(v)}$ can also be obtained.

$$\phi_{f,t}^{(v)} \leftarrow tr(y_{f,t} y_{f,t}^H R_f^{(v)-1}) \quad \text{[Equation 8]}$$

$$R_f^{(v)} \leftarrow \frac{1}{\sum_t \lambda_{f,t}^{(v)}} \sum_t \lambda_{f,t}^{(v)} \frac{1}{\phi_{f,t}^{(v)}} y_{f,t} y_{f,t}^H \quad \text{[Equation 9]}$$

After convergence, the obtained posteriori probability $\lambda_{f,t}^{(v)}$ can be used as a signal mask in the time-frequency plane. A covariance matrix for estimating a steering vector can be obtained from the value of the mask, and the calculation equation is as follows.

$$R_f^{(x+n)} = \frac{1}{T} \sum_t y_{f,t} y_{f,t}^H \quad \text{[Equation 10]}$$

$$R_f^{(n)} = \frac{1}{\sum_t \lambda_{f,t}^{(n)}} \sum_t \lambda_{f,t}^{(n)} y_{f,t} y_{f,t}^H \quad \text{[Equation 11]}$$

$$R_f^{(x)} = R_f^{(x+n)} - R_f^{(n)} \quad \text{[Equation 12]}$$

By performing eigenvector decomposition of the covariance matrix $R_f^{(x)}$ of the target signal estimated as described above, an eigenvector having the largest eigenvalue can be obtained as a steering vector. In addition, the information of the steering vector obtained in each time frame can be used to supplement the parameters of the CGMM performed in the next time frame.

SUMMARY OF THE INVENTION

The present invention is to provide a source localization method using steering vector estimation based on an on-line complex Gaussian mixture model using a recursive least squares technique.

According to an aspect of the present invention, there is provided the source localization method using input signals input from a plurality of microphones in an apparatus for performing a source localization, a target sound source enhancement or speech recognition, comprising steps of: (a) obtaining a log likelihood function or an auxiliary function under the assumption that a target source signal mixed with noises satisfies a CGMM model; (b) obtaining an equation for estimating parameter values of the log likelihood function or the auxiliary function so that a value of the log likelihood function or the auxiliary function is maximized recursively in each time frame; (c) estimating a covariance matrix recursively in each time frame; and (d) estimating a steering vector recursively by using the estimated covariance matrix, so that the steering vector of the target sound source is estimated from the input signals.

In the source localization method according to the above aspect, it is preferable that the step (c) is estimating a covariance matrix in each time frame and normalizing the covariance matrix.

In the source localization method according to the above aspect, it is preferable that the step (d) is estimating a steering vector as a value of an eigenvector having a largest eigenvalue by eigenvector-decomposing the covariance matrix.

In the source localization method according to the above aspect, it is preferable that the log likelihood function or the auxiliary function includes a forgetting factor.

To verify the performance for the methods according to the conventional algorithm and the present invention, Table 1 below lists word error rates (WER) measured for the methods in the related art and the method according to the present invention.

According to the conventional algorithm and the present invention, the steering vector is estimated from an input signal of the microphone, a sound enhancement is performed with Minimum Variance Distortionless Response (MVDR) by using the steering vector, and then words are recognized and the WERs are measured.

TABLE 1

| WER (%) | Simulation Environment | Real Environment |
| --- | --- | --- |
| Baseline | 20.84 | 23.7 |
| Proposed Method | 11.46 | 12.19 |

As listed in Table 1, it can be understood that, in both the simulation environment and the real environment, the recognition rate by the method according to the present invention is much lower than those in the methods in the related art.

BRIEF DESCRIPTION OF THE DRAWINGS

FIG. 1 is a flowchart illustrating a steering vector estimation method according to a preferred embodiment of the present invention;

DETAILED DESCRIPTION OF THE EMBODIMENTS

Figure 2:
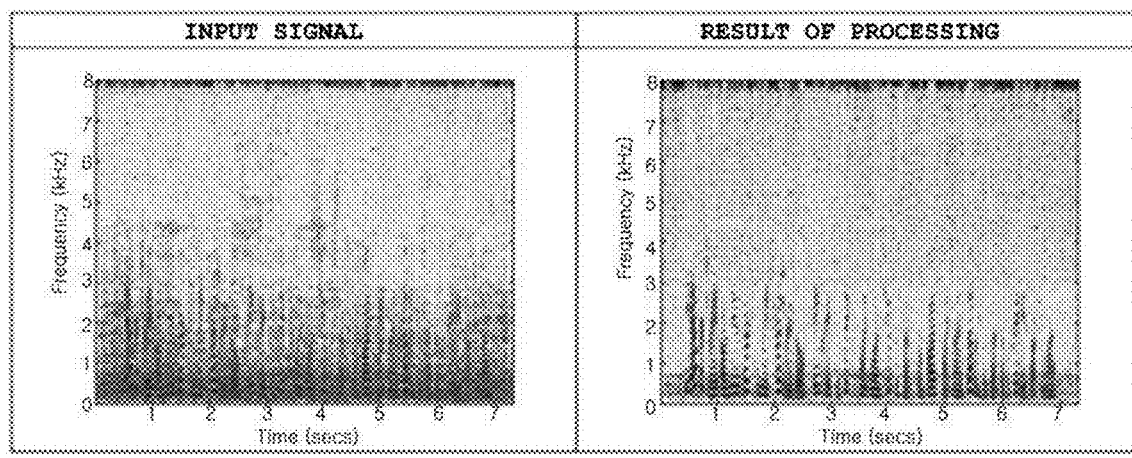
FIG. 2 is a graph illustrating a MVDR result obtained by using a CHiME4 data in a simulation environment in the steering vector estimation method according to the present invention.

Hereinafter, a real-time CGMM-based steering vector estimation method using recursive estimation according to a preferred embodiment of the pre sent invention will be described in detail with reference to the accompanying drawings.

In order to recursively estimate parameters, a log likelihood function or an auxiliary function introduced with a forgetting factor γ can be obtained as follows.

$$Q = \sum_{t=1}^{T} \gamma^{T-t} \sum_f \sum_v \lambda_{f,t}^{(v)} \log \kappa_f^{(v)} p(y_{f,t} | d_{f,t} = v, \Theta)$$ [Equation 13]

$$p(y_{f,t} | d_{f,t} = v, \Theta) =$$ [Equation 14]

$$\frac{\xi_{f,c}^{(v)}}{\det(\phi_{f,t}^{(v)} R_f^{(v)})} \exp\left(\left(-y_{f,t}^H (\phi_{f,t}^{(v)} R_f^{(v)})^{-1} y_{f,t}\right)\right)^c$$

Herein, a probability density function of a signal is a complex generalized Gaussian distribution. The parameter $\kappa_f^{(v)}$ is a Gaussian mixture weight and allows the sum of probability densities to be 1, and the distribution of the probability density function can be varied through a value of a parameter c. The parameter $\xi_{f,c}^{(v)}$ is calibrated to allow the sum of probability densities of the complex generalized Gaussian to be 1 according to the value of a parameter c. In the present invention, the value of the parameter c is 1, and in this case, the probability density function matches with the Gaussian distribution.

$$Q = \sum_{t=1}^{T} \gamma^{T-t} \sum_f \sum_v \lambda_{f,t}^{(v)} \log \kappa_f^{(v)} N_c(y_{f,t}; 0, \phi_{f,t}^{(v)} R_f^{(v)}),$$ [Equation 15]

$$N_c(y_{f,t}; 0, \phi_{f,t}^{(v)} R_f^{(v)}) =$$

$$\frac{1}{\pi^M \det(\phi_{f,t}^{(v)} R_f^{(v)})} \exp\left(-y_{f,t}^H (\phi_{f,t}^{(v)} R_f^{(v)})^{-1} y_{f,t}\right)$$

The update expression of the variables for maximizing the value of the log likelihood function or an auxiliary function is as follows.

$$\frac{\partial Q}{\partial \phi_{f,t}^{(v)}} = \gamma^{T-t} \lambda_{f,t}^{(v)} \left[-\frac{M}{\phi_{f,t}^{(v)}} + \frac{1}{(\phi_{f,t}^{(v)})^2} y_{f,t}^H (R_f^{(v)})^{-1} y_{f,t}\right] = 0$$ [Equation 16]

$$\phi_{f,t}^{(v)} \leftarrow \frac{1}{M} y_{f,t}^H (R_f^{(v)})^{-1} y_{f,t}$$

$$\lambda_{f,t}^{(v)} \leftarrow \frac{\kappa_f^{(v)} p(y_{f,t} | d_{f,t} = v, \Theta)}{\sum_v \kappa_f^{(v)} p(y_{f,t} | d_{f,t} = v, \Theta)}$$

-continued $$\kappa_f^{(v)} \leftarrow \frac{1}{\sum_t \gamma^{T-t}} \sum_t \gamma^{T-t} \lambda_{f,t}^{(v)}$$

Similarly, the equation of $R_f^{(v)}$ can be obtained by the method of maximizing the log likelihood or the auxiliary function, as follows.

$$\frac{\partial Q}{\partial (R_f^{(v)})^{-1}} = \sum_t \gamma^{T-t} \lambda_{f,t}^{(v)} \left[ R_f^{(v)} - \frac{1}{\phi_{f,t}^{(v)}} y_{f,t} y_{f,t}^H \right] = 0 \quad \text{[Equation 17]}$$

$$\left( \sum_t \gamma^{T-t} \lambda_{f,t}^{(v)} \right) R_f^{(v)} = \sum_t \gamma^{T-t} \lambda_{f,t}^{(v)} \frac{1}{\phi_{f,t}^{(v)}} y_{f,t}^{(v)} y_{f,t}^{(v)H}$$

For simplification, it is defined that $$\left( \sum_t \gamma^{T-t} \lambda_{f,t}^{(v)} \right) R_f^{(v)} = \Gamma_f^{(v)}(t),$$

and thus, the following equation is obtained.

$$\Gamma_f^{(v)}(T) = \quad \text{[Equation 18]}$$

$$\gamma \sum_{t=1}^{T} \gamma^{(T-1)-t} \lambda_{f,t}^{(v)} \frac{1}{\phi_{f,t}^{(v)}} y_{f,t} y_{f,t}^H + \lambda_{f,T}^{(v)} \frac{1}{\phi_{f,T}^{(v)}} y_{f,T} y_{f,T}^H =$$

$$\gamma \Gamma_f^{(v)}(T-1) + \lambda_{f,T}^{(v)} \frac{1}{\phi_{f,T}^{(v)}} y_{f,T} y_{f,T}^H$$

Therefore, an expression for recursively estimating the value of the parameter in each time frame can be obtained. This estimation equation of $(\Gamma_f^{(v)}(t))^{-1}$ can be expressed as follows.

$$(\Gamma_f^{(v)}(T))^{-1} = \gamma^{-1} \left[ \begin{array}{c} (\Gamma_f(T-1))^{-1} - \\ \frac{(\Gamma_f(T-1))^{-1} y_{f,T} y_{f,T}^H (\Gamma_f(T-1))^{-1}}{\gamma \frac{\phi_{f,T}^{(v)}}{\lambda_{f,T}^{(v)}} + y_{f,T}^H (\Gamma_f(T-1))^{-1} y_{f,T}} \end{array} \right] \quad \text{[Equation 19]}$$

Therefore, the estimation equation of $(R_f^{(v)}(T))^{-1}$ is as follows.

$$(R_f^{(v)}(T))^{-1} = \left( \sum_t \gamma^{T-t} \lambda_{f,t}^{(v)} \right) (\Gamma_f^{(v)}(T))^{-1} \quad \text{[Equation 20]}$$

In order to prevent the covariance matrix $R_f^{(v)}$ from becoming too large or too small to converge, the covariance matrix is normalized as follows. Herein, $\odot$ indicates element-wise multiplication. The parameter $\rho$ is a parameter for adjusting a value multiplied by the diagonal elements of the unit matrix, and thus, in the present invention, the parameter $\rho$ is fixed as $\rho = -1$.

$$R_f^{(v)} = \frac{R_f^{(v)} + R_f^{(v)H}}{2}, \quad \text{[Equation 21]}$$

$$\eta = \text{mean}(\text{diag}(R_f^{(v)}) \odot \text{diag}(R_f^{(v)})),$$

$$R_f^{(v)} = \frac{1}{\eta} R_f^{(v)} + 10^\rho I,$$

$$R_f^{(v)} = \frac{1}{(\det(R_f^{(v)}))^{\frac{1}{M}}} R_f^{(v)}$$

The covariance matrix to be estimated for the steering vector calculation can also be obtained in each time frame, as follows.

$$\left( \sum_t \gamma^{T-t} \lambda_{f,t}^{(v)} \right) R_f'^{(v)}(T) = \quad \text{[Equation 22]}$$

$$\gamma \left( \sum_{t=1}^{T-1} \gamma^{(T-1)-t} \lambda_{f,t}^{(v)} R_f'^{(v)}(T-1) + \lambda_{f,T}^{(v)} y_{f,T} y_{f,T}^H \right)$$

$$\Gamma_f'^{(v)}(T) = \gamma \Gamma_f'^{(v)}(T-1) - \lambda_{f,T}^{(v)} y_{f,T} y_{f,T}^H$$

$$R_f'^{(v)}(T) = \frac{1}{\sum_{t=1}^{T} \gamma^{T-t} \lambda_{f,t}^{(v)}} \Gamma_f'^{(v)}(T)$$

$$R_f'^{(x)} = R_f'^{(x+n)} - R_f'^{(n)}$$

The steering vector can be calculated as the value of the eigenvector having the largest eigenvalue obtained through eigenvector decomposition of the covariance matrix obtained as above. The parameter $\kappa_f^{(v)}$ can be used by a fixed value to simplify the algorithm.

In addition, it is necessary to set the initial value of $R_f^{(v)}$, $(\Gamma^{(v)})^{-1}$, $\Gamma^{(v)}$ in the starting process of the algorithm. There are various methods as the initialization methods, and the following four methods are exemplified. $\alpha_f^{(v)}$, $\beta_f^{(v)}$, $\eta_f^{(v)}$ are parameters acting as weighting factors according to frequency and v. In the present invention, the initialization is performed by using the equations described in the entire algorithm of FIG. 1.

(1) Method 1: This method is in accordance with Equation 23.

$$R_f^{(x+n)}(0) = \alpha_f^{(v)}(y_{f,1} y_{f,1}^H), R_f^{(n)}(0) = \alpha_f^{(v)} I$$

$$(\Gamma_f^{(x+n)}(0))^{-1} = \beta_f^{(v)}(y_{f,1} y_{f,1}^H)^{-1}, (\Gamma_f^{(n)}(0))^{-1} = \beta_f^{(v)}(y_{f,1} y_{f,1}^H)^{-1}$$

$$\Gamma_f'^{(x+n)}(0) = \eta_f^{(v)}(y_{f,1} y_{f,1}^H), \Gamma_f'^{(n)}(0) = \eta_f^{(v)}(y_{f,1} y_{f,1}^H)^{-1} \quad \text{[Equation 23]}$$

(2) Method 2: This method is in accordance with Equation 24.

$$R_f^{(x+n)}(0) = \alpha_f^{(v)}(y_{f,1} y_{f,1}^H), R_f^{(n)}(0) = \alpha_f^{(v)} I$$

$$(\Gamma_f^{(x+n)}(0))^{-1} = \beta_f^{(v)}(y_{f,1} y_{f,1}^H)^{-1}, (\Gamma_f^{(n)})^{-1}(0) = \beta_f^{(v)} I$$

$$\Gamma_f'^{(x+n)}(0) = \eta_f^{(v)}(y_{f,1} y_{f,1}^H), \Gamma_f'^{(n)}(0) = \eta_f^{(v)} I \quad \text{[Equation 24]}$$

(3) Method 3: This method is a method of taking only diagonal elements from methods 1 and 2 described above.

(4) Method 4: This method is a method of steering information of a target signal in a case where the target signal is known.

The overall algorithm using the above results is illustrated in FIG. 1, where $N_t$ is the number of total time frames. FIG.

1 is a flowchart illustrating an algorithm for a steering vector estimation method according to a preferred embodiment of the present invention.

Hereinafter, the MVDR beamforming which is a representative application example using the steering vector according to the present invention will be described in detail.

The MVDR beamforming for noise removal by using a steering vector $r_{f,t}$ and a covariance matrix of noise $R_f^{(n)}$ which are recursively estimated. The MVDR beamforming estimates a filter coefficient such that the gain of a signal coming in the direction of the estimated steering vector is maintained to be 1 and the gains of signals coming in the other directions are reduced. This estimation can be expressed by Equation 25.

$$\hat{\omega} = \mathrm{argmin}_\omega(\omega^H R_n \omega), \text{ s.t. } \omega^H r = 1$$

$$\rightarrow \hat{\omega} = \frac{R_n^{-1} r}{r^H R_n^{-1} r}$$

[Equation 25]

Therefore, when the MVDR beamforming is performed by using the recursively estimated steering vector and the recursively estimated covariance matrix of noise using the CGMM in each time frame, the noise can be effectively removed.

Figure 3:
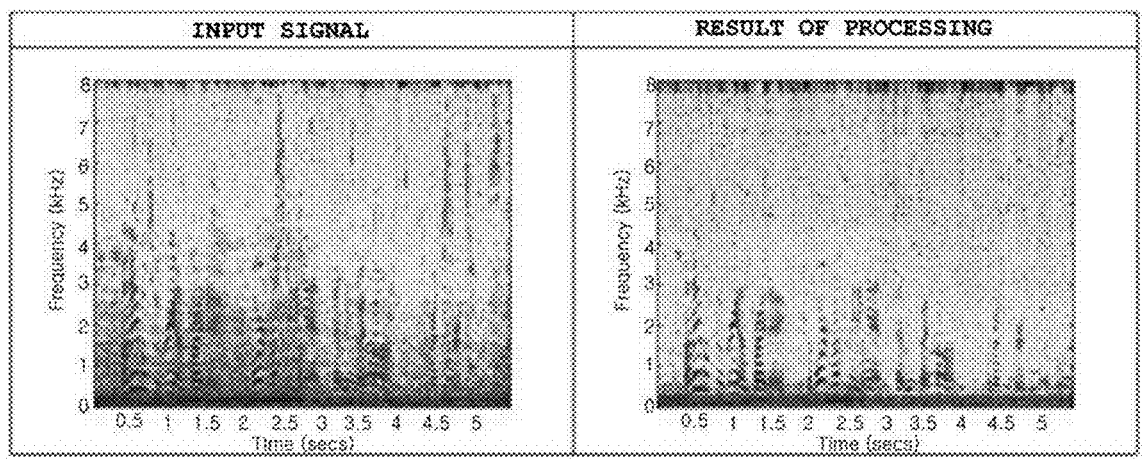
FIG. 3 is a graph illustrating a MVDR result obtained by using a CHiME4 data in a real environment in the steering vector estimation method according to the present invention.

The MVDR results obtained by using the CHiME4 data are as follows:

FIG. 2 is a graph illustrating a MVDR result obtained by using the CHiME4 data in a simulation environment in the steering vector estimation method according to the present invention. FIG. 3 is a graph illustrating a MVDR result obtained by using the CHiME4 data in a real environment in the steering vector estimation method according to the present invention.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

What is claimed is:

1. A source localization method comprising:
   (a) receiving, by one or more processors, input signals from a plurality of microphones;
   (b) obtaining, by the one or more processors, a log likelihood function or an auxiliary function under the assumption that a target source signal mixed with noises of the input signals satisfies a CGMM model,
   (c) obtaining, by the one or more processors, an equation for estimating parameter values of the log likelihood function or the auxiliary function so that a value of the log likelihood function or the auxiliary function is maximized recursively in each time frame,
   (d) estimating, by the one or more processors, a covariance matrix recursively in each time frame,
   (e) estimating, by the one or more processors, a steering vector recursively by using the estimated covariance matrix,
   wherein the steering vector of the target sound source is estimated from the input signals, and
   wherein the step (e) is estimating a steering vector as a value of an eigenvector having a largest eigenvalue by eigenvector-decomposing the covariance matrix, and
   (f) performing, by the one or more processors, a source localization of a target sound from the input signals by performing a sound enhancement of the input signals using the steering vector.

2. The source localization method according to claim 1, wherein the step (d) is estimating a covariance matrix in each time frame and normalizing the covariance matrix.

3. The source localization method according to claim 1, wherein the log likelihood function or the auxiliary function includes a forgetting factor.

4. A non-transitory computer-readable storage medium recording a program that implements the source localization method according to claim 1 so as to be executable by a processor of the apparatus for performing a source localization, a target sound source enhancement or speech recognition.

* * * * *